United States Patent
Sato et al.

(10) Patent No.: US 7,328,991 B2
(45) Date of Patent: Feb. 12, 2008

(54) INK AND INK-APPLYING PROCESS AND APPARATUS USING THE SAME

(75) Inventors: Koichi Sato, Atsugi (JP); Ikuo Nakazawa, Zama (JP); Sakae Suda, Sagamihara (JP); Masayuki Ikegami, Atsugi (JP); Junko Morioka, Fukui (JP); Takayuki Okawa, Fukui (JP)

(73) Assignee: Canon Kabushiki Kaisha, Tokyo (JP)

( * ) Notice: Subject to any disclaimer, the term of this patent is extended or adjusted under 35 U.S.C. 154(b) by 283 days.

(21) Appl. No.: 10/983,572

(22) Filed: Nov. 9, 2004

(65) Prior Publication Data

US 2005/0140762 A1 Jun. 30, 2005

(30) Foreign Application Priority Data

Nov. 11, 2003 (JP) ............................. 2003-381042

(51) Int. Cl.
*G01D 11/00* (2006.01)
(52) U.S. Cl. .................... 347/100; 347/95; 523/160
(58) Field of Classification Search ............... 347/100, 347/101, 95, 96; 106/31.6, 31.13, 31.27; 523/160
See application file for complete search history.

(56) References Cited

U.S. PATENT DOCUMENTS

| | | | |
|---|---|---|---|
| 4,313,124 A | 1/1982 | Hara | 346/140 R |
| 4,345,262 A | 8/1982 | Shirato et al. | 346/140 R |
| 4,459,600 A | 7/1984 | Sato et al. | 346/140 R |
| 4,463,359 A | 7/1984 | Ayata et al. | 346/1.1 |
| 4,558,333 A | 12/1985 | Sugitani et al. | 346/140 R |
| 4,723,129 A | 2/1988 | Endo et al. | 346/1.1 |
| 4,740,796 A | 4/1988 | Endo et al. | 346/1.1 |
| 5,085,698 A | 2/1992 | Ma et al. | 106/20 |
| 5,607,999 A * | 3/1997 | Shimizu et al. | 347/100 |
| 5,714,538 A | 2/1998 | Beach et al. | 524/504 |
| 2002/0032252 A1 | 3/2002 | Ishizuka | 523/160 |
| 2002/0186288 A1* | 12/2002 | Nakazawa et al. | 347/100 |
| 2003/0027894 A1 | 2/2003 | Sato et al. | 523/160 |
| 2003/0050364 A1 | 3/2003 | Sato et al. | 523/160 |
| 2003/0081086 A1* | 5/2003 | Suzuki et al. | 347/86 |

FOREIGN PATENT DOCUMENTS

| | | |
|---|---|---|
| JP | 59-123670 | 7/1984 |
| JP | 59-138461 | 8/1984 |
| JP | 11-80221 | 3/1999 |
| JP | 11-322866 A | 11/1999 |
| JP | 11-322942 A | 11/1999 |

OTHER PUBLICATIONS

Sakdahito Aoshima, et al., "Living Cationic Polymerization of Vinyl Monomers by Organoaluminium Halides", Polymer Bulletin 15, pp. 417-423 (1986).

* cited by examiner

*Primary Examiner*—Manish S. Shah
(74) *Attorney, Agent, or Firm*—Fitzpatrick, Cella, Harper & Scinto

(57) ABSTRACT

Disclosed herein is an ink including a coloring material, a resin and a solvent, wherein the resin is a block copolymer of a polyvinyl ether structure having a hydrophilic segment and a hydrophobic segment, and the hydrophilic segment of the block copolymer has a number average molecular weight of 1,000 to 50,000 and an HLB value of 4 to 18.

8 Claims, 1 Drawing Sheet

FIGURE
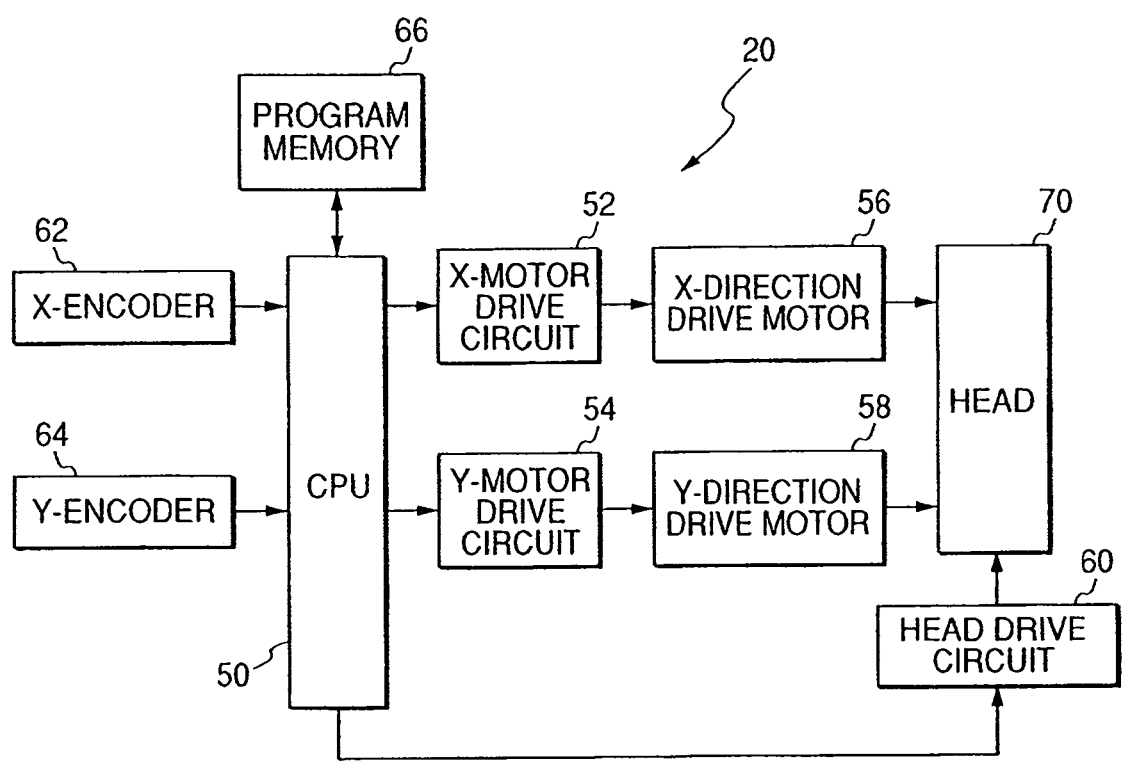

INK AND INK-APPLYING PROCESS AND APPARATUS USING THE SAME

BACKGROUND OF THE INVENTION

1. Field of the Invention

The present invention relates to an ink, and an ink-applying process and an ink-applying apparatus using this ink.

2. Description of the Background Art

Water-based inks are principally used as inks for ink-jet printers which have become widely used with the spread of computers from the viewpoint of safety and the like. Among these, water-based inks using a water-soluble dye are most widely spread because of their excellent coloring ability. However, the water-based inks using such a water-soluble dye involve problems that they are poor in water fastness because the dye is soluble in water, and that they are rapidly deteriorated by light or gasses such as ozone because the dye is in a molecular state.

In order to solve these problems, an investigation is carried out as to inks using an insoluble coloring agent such as a pigment, which is in such a form that a plurality of molecules are agglomerated, and not in the state of a molecule. These dispersed type inks are superior in the so-called image fastness properties such as water fastness, light fastness and gas fastness compared to inks using water-soluble coloring matter, but are required to be more improved in storage stability and the fixing ability of an image formed.

Thus, in order to enhance the dispersibility of fine particles of an insoluble coloring agent to stabilize ejection and to improve the fixing ability of an image, there have been proposed inks using a block copolymer (see U.S. Pat. No. 5,085,698) and a graft copolymer (see U.S. Pat. No. 5,714,538), which contain a portion easy to adhere to such an insoluble coloring agent and a portion having high affinity for a hydrophilic medium. Further, there has also been proposed a method, in which an oil-soluble dye insoluble in water is dissolved in an organic solvent, the resultant solution is mixed with a polymer, and water is added to this mixture to make the medium hydrophilic, thereby depositing the oil-soluble dye as fine particles (see U.S. AA 20020032252).

According to these techniques, the dispersion stability of the coloring agent is improved by the action of the block copolymer or graft copolymer containing segments having affinity for both the insoluble coloring agent and the hydrophilic medium. However, still more improvements are desired from the viewpoints of lowering the viscosity for stabilizing ejection and improving fixing ability.

SUMMARY OF THE INVENTION

The present invention has been made in view of the foregoing circumstances and has as its object the provision of an ink good in both ejection stability from a nozzle and fixing ability of an image formed.

Another object of the present invention is to provide an ink-applying process and an ink-applying apparatus, by which the above-described ink can be stably applied to a recording medium.

The above objects can be achieved by the present invention described below.

In an aspect of the present invention, there is thus provided an ink comprising a coloring material, a resin and a solvent, wherein the resin is a block copolymer of a polyvinyl ether structure having a hydrophilic segment and a hydrophobic segment, and the hydrophilic segment of the block copolymer has a number average molecular weight of 1,000 to 50,000 and an HLB value of 4 to 18.

In another aspect of the present invention, there is provided an ink-applying process comprising the step of applying the ink described above to a recording medium.

In a further aspect of the present invention, there is provided an ink-applying apparatus comprising an ink-applying means for applying the ink described above to a recording medium by applying energy to the ink, and a driving means for driving the ink-applying means.

According to the present invention, there can be provided an ink good in both ejection stability from a nozzle and fixing ability of an image formed.

According to the present invention, there can also be provided an ink-applying process and an ink-applying apparatus, by which the above-described ink can be stably applied to a recording medium.

BRIEF DESCRIPTION OF THE DRAWINGS

FIGURE schematically illustrates the mechanism of an image-recording apparatus according to the present invention.

DETAILED DESCRIPTION OF THE PREFERRED EMBODIMENTS

The present invention will hereinafter be described in more detail by the preferred embodiments.

A first embodiment of the present invention relates to an ink comprising a coloring material, a resin, an organic solvent and water, wherein the resin is a block copolymer of a polyvinyl ether structure each having at least one hydrophilic segment and one hydrophobic segment, and the hydrophilic segment of the block copolymer has a number average molecular weight of 1,000 to 50,000 and an HLB value of 4 to 18.

The term "HLB" is an index indicating a hydrophilic-hydrophobic balance, as well recognized in this technical field, and is a value obtained by dividing a molecular weight of a hydrophilic portion by a molecular weight of the whole copolymer, further dividing this value by 5 and multiplying the resultant value by 100.

The block copolymer used in the present invention each has at least one hydrophilic segment (A) and hydrophobic segment (B).

No particular limitation is imposed on the configuration of the respective segments in the block copolymer. However, the hydrophilic segment is preferably located at a terminal of a polymer chain from the viewpoint of enhancing the dispersibility of the coloring material. Examples of the block form include AB, ABA' (A and A' may be the same or different from each other), AA'B and BB'A types. A, A', B and B' are segments of a homopolymer or copolymer.

The block copolymer used in the present invention is a block copolymer containing a hydrophilic segment composed of a homopolymer or copolymer of a vinyl ether type monomer and a hydrophobic segment composed of a homopolymer or copolymer of a vinyl ether type monomer.

These polymers preferably have a repeating unit structure represented by the following general formula (1).

 (1)

In the general formula (1), $R^1$ is an aliphatic or alicyclic hydrocarbon group such as an alkyl, alkenyl, cycloalkyl or cycloalkenyl group, or an aromatic hydrocarbon group, the carbon atom of which may be substituted by a nitrogen atom, such as a phenyl, pyridyl, benzyl, toluyl, xylyl, alkylphenyl, phenylalkylene, biphenyl or phenylpyridyl group. A hydrogen atom on the aromatic ring may be substituted by a hydrocarbon group. $R^1$ preferably has 1 to 18 carbon atoms.

$R^1$ may be a group represented by —(CH($R^2$)—CH($R^3$)—O)$_p$—$R^4$ or —(CH$_2$)$_m$—(O)$_n$—$R^4$. In this case, $R^2$ and $R^3$ are, independently of each other, hydrogen or methyl, $R^4$ is an aliphatic or alicyclic hydrocarbon group such as an alkyl, alkenyl, cycloalkyl or cycloalkenyl group, an aromatic hydrocarbon group, the carbon atom of which may be substituted by a nitrogen atom (a hydrogen atom on the aromatic ring may be substituted by a hydrocarbon group), such as a phenyl, pyridyl, benzyl, toluyl, xylyl, alkylphenyl, phenylalkylene, biphenyl or phenylpyridyl group, —CHO, —CH$_2$CHO, —CO—CH=CH$_2$, —CO—C(CH$_3$)=CH$_2$, —CH$_2$—CH=CH$_2$, —CH$_2$—C(CH$_3$)=CH$_2$, or —CH$_2$—COOR$^5$, with the proviso that hydrogen atoms in each group may be substituted by halogen atoms such as fluorine, chlorine and bromine within limits chemically permitted, and $R^4$ preferably has 3 to 18 carbon atoms, $R^5$ is hydrogen or an alkyl group, p is preferably 1 to 18, m is preferably 1 to 36, and n is preferably 0 or 1.

In $R^1$ and $R^5$, examples of the alkyl and alkenyl groups include methyl, ethyl, propyl, isopropyl, n-butyl, sec-butyl, t-butyl, pentyl, hexyl, heptyl, octyl, nonyl, decyl, dodecyl, tetradecyl, hexadecyl, octadecyl, oleyl and linoleyl groups, and examples of the cycloalkyl and cycloalkenyl groups include cyclopropyl, cyclobutyl, cyclopentyl, cyclohexyl, cyclooctyl and cyclohexenyl groups.

The structures of monomers (I-a to I-o) and polymers (II-a to II-e) containing the repeating unit represented by the general formula (1) described above are illustrated below. However, the polyvinyl ether structures used in the present invention are not limited thereto.

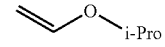 (I-a)

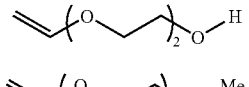 (I-b)

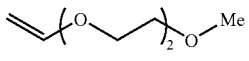 (I-c)

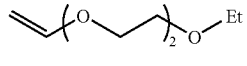 (I-d)

-continued

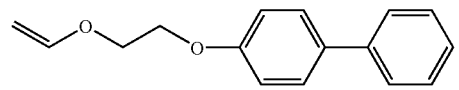 (I-e)

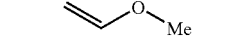 (I-f)

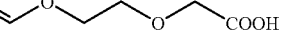 (I-g)

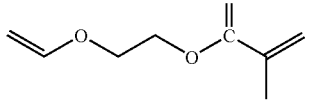 (I-h)

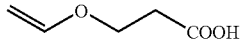 (I-i)

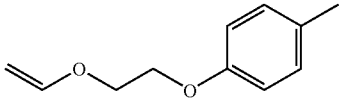 (I-j)

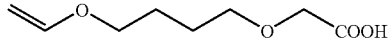 (I-k)

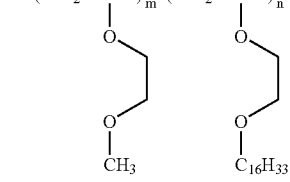 (I-l)

(I-m)

(I-n)

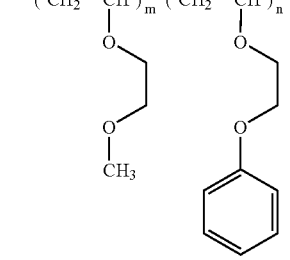 (I-o)

(II-a)

(II-b)

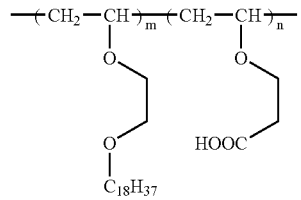 (II-c)

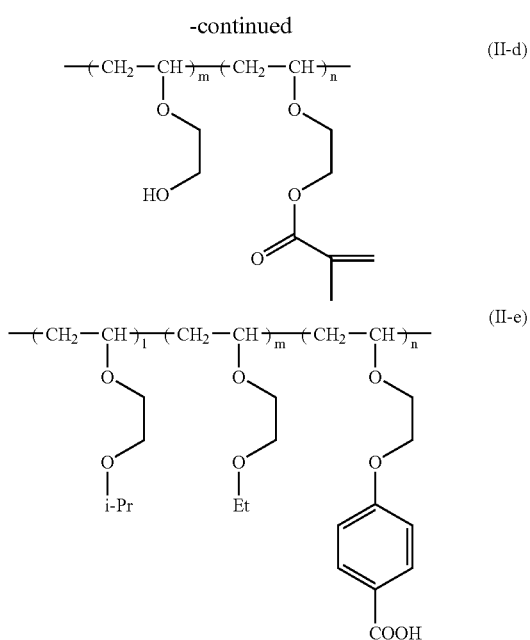

In the monomers (I-a to I-o) making up the repeating unit represented by the general formula (1), monomers making up the hydrophilic segment are, for example, I-a, I-k and I-o, and monomers making up the hydrophobic segment are, for example, I-d, I-e and I-i.

Proportions of the hydrophilic segment and hydrophobic segment contained in the block copolymer having the polyvinyl ether structure in the present invention are preferably 10 to 90% by mole and 90 to 10% by mole, respectively.

These polyvinyl ethers may graft-bonded to another polymer or copolymerized with another repeating unit structure. Each segment also includes a copolymer of a vinyl ether type monomer and any other monomer than it.

Many synthesizing processes for a polymer containing a polyvinyl ether structure have been reported (for example, Japanese Patent Application Laid-Open No. 11-080221). A process by cationic living polymerization by Aoshima, et al (Journal of Polymer Bulletin, Vol. 15, p. 417, 1986; Japanese Patent Application Laid-Open Nos. 11-322942 and 11-322866) is representative thereof. By conducting polymer synthesis by the cationic living polymerization, various polymers such as homopolymers, copolymers composed of two or more monomers, block polymers, graft polymers and graduation polymers can be synthesized with their chain lengths (molecular weights) exactly made uniform. Further, in the polyvinyl ether, various functional groups can be introduced into side chains thereof. Besides, the cationic polymerization process may also be conducted in a $HI/I_2$ system, $HCl/SnCl_4$ system or the like.

These block copolymers of the polyvinyl ether structure have such a nature that the hydrophobic segment has affinity for a coloring material and strongly interacts with the surface of the coloring material, while the hydrophilic segment stabilizes the dispersion of the coloring material in the resulting water-based ink and strongly sticks to a recording medium when the ink is applied to the recording medium.

A hydrophilic segment having a lower molecular weight is advantageous for keeping a low viscosity of the resulting ink to avoid a phenomenon such as gelling. When the molecular weight of the hydrophilic segment is higher on the other hand, the fixing ability of the coloring material is increased. Preferable ranges of such properties generally vary according to the structure of a main chain of a polymer and the glass transition temperature of the polymer. In the case of the block copolymer composed of the repeating unit structure of the polyvinyl ether structure and characteristically used in the present invention, when the number average molecular weight and HLB of the hydrophilic segment fall within ranges of from 1,000 to 50,000 and from 4 to 18, respectively, the coloring material can be well dispersed in a water-based medium at a low viscosity, and at the same time, good fixing ability can also be developed when the ink is applied to a recording medium.

In the present invention, HLB means a hydrophilic-hydrophobic balance generally used in an amphiphilic substance and a value obtained by dividing a molecular weight fraction, in terms of %, of the hydrophilic segment to the whole molecular weight of the amphiphilic substance by 5. More specifically, HLB is a value obtained by dividing a % fraction in the polymer of the total average molecular weight of the hydrophilic segment in the amphiphilic block copolymer characteristically used in the present invention by 5. In the present invention, a number average molecular weight is used as the average molecular weight. For example, when the number average molecular weight of a hydrophilic segment in a block copolymer having a number average molecular weight of 20,000 is 10,000, HLB is 10. The HLB falls within a range of from 4 to 18, preferably from 8 to 18, more preferably from 10 to 16.

In order that ink-jet ejection properties may be improved, the coloring material may be well dispersed in a water-based medium at a low viscosity, and at the same time, good fixing ability may also be developed when the ink is applied to a recording medium, the number average molecular weight of the hydrophilic block is preferably 5,000 to 50,000, and the number average molecular weight of the hydrophobic block is preferably 3,000 or higher, more preferably 5,000 or higher. Likewise, a preferable range of HLB is from 10 to 18, more preferably from 14 to 18. Particularly preferable property can be developed from the viewpoint of rub-off resistance when the HLB is between 15 and 16. Likewise, the number average molecular weight of the block copolymer is 10,000 or higher.

The block copolymer preferably has at least two hydrophilic segments, and one block segment of them desirably has a repeating unit containing an anionic group.

The repeating unit containing the anionic group is preferably a repeating unit structure represented by the following general formula (2).

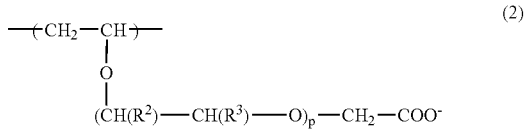

In the general formula (2), $R^2$ and $R^3$ are, independently of each other, hydrogen or methyl, and p is preferably 1 to 18.

The proportion of the block copolymer contained in the ink is preferably 0.001 to 40% by weight, more preferably 0.01 to 20% by weight based on the total weight of the ink. When the amount of the block copolymer is 0.001 to 40% by weight, the resulting ink can provide an image having a preferable image density, and exhibits preferable ejection stability.

Examples of the coloring material used in the present invention include pigments, oil-soluble dyes, disperse dyes and vat dyes. Besides, those obtained by insolubilizing a water-soluble dye such as a direct dye, acid dye, basic dye or reactive dye by some treatment may also be mentioned. Specific examples thereof include the following coloring materials. However, the present invention is not limited thereto.

(Pigment)

Examples of commercially available pigments in black, cyan, magenta and yellow are mentioned below.

As examples of black pigments, may be mentioned Raven 1060 (product of Columbian Carbon Japan Limited), MOGUL-L (product of Cabot Company), Color Black FW1 (product of Degussa AG) and MA100 (product of Mitsubishi Chemical Corporation). However, the present invention is not limited thereto.

As examples of cyan pigments, may be mentioned C.I. Pigment Blue 15:3, C.I. Pigment Blue 15:4 and C.I. Pigment Blue 16. However, the present invention is not limited thereto.

As examples of magenta pigments, may be mentioned C.I. Pigment Red 122, C.I. Pigment Red 123 and C.I. Pigment Red 146. However, the present invention is not limited thereto.

As examples of yellow pigments, may be mentioned C.I. Pigment Yellow 74, C.I. Pigment Yellow 128 and C.I. Pigment Yellow 129. However, the present invention is not limited thereto.

(Oil-Soluble Dye)

As examples of oil-soluble dyes of black, may be mentioned C.I. Solvent Black 3, 22:1 and 50. However, the present invention is not limited thereto.

As examples of oil-soluble dyes of yellow, may be mentioned C.I. Solvent Yellow 1, 25:1 and 172. However, the present invention is not limited thereto.

As examples of oil-soluble dyes of orange, may be mentioned C.I. Solvent Orange 1, 40:1 and 99. However, the present invention is not limited thereto.

As examples of oil-soluble dyes of red, may be mentioned C.I. Solvent Red 1, 111 and 229. However, the present invention is not limited thereto.

As examples of oil-soluble dyes of violet, may be mentioned C.I. Solvent Violet 2, 11 and 47. However, the present invention is not limited thereto.

As examples of oil-soluble dyes of blue, may be mentioned C.I. Solvent Blue 2, 43 and 134. However, the present invention is not limited thereto.

As examples of oil-soluble dyes of green, may be mentioned C.I. Solvent Green 1, 20 and 33. However, the present invention is not limited thereto.

As examples of oil-soluble dyes of brown, may be mentioned C.I. Solvent Brown 1, 12 and 58. However, the present invention is not limited thereto.

(Disperse Dye)

As examples of disperse dyes, may be mentioned C.I. Disperse Yellow 88, C.I. Disperse Red 349, C.I. Disperse Blue 160 and C.I. Disperse Black 1. However, the present invention is not limited thereto.

(Vat Dye)

As examples of vat dyes, may be mentioned C.I. Vat Yellow 2, 10 and 30; C.I. Vat Orange 1, 5 and 15; C.I. Vat Red 1, 13 and 61; C.I. Vat Violet 1, 13, 21; C.I. Vat Blue 18 and 41; C.I. Vat Green 1, 4 and 9; C.I. Vat Brawn 1, 25 and 46; and C.I. Vat Black 1, 29 and 60. However, the present invention is not limited thereto.

(Direct Dye)

As examples of acid dyes, may be mentioned C.I. Direct Black 17, 62 and 154; C.I. Direct Yellow 12, 87 and 142; C.I. Direct Red 1, 62 and 243; C.I. Direct Blue 6, 78 and 199; C.I. Direct Orange 34 and 60; C.I. Direct Violet 47 and 48; C.I. Direct Brown 109; and C.I. Direct Green 59. However, the present invention is not limited thereto.

(Acid Dye)

As examples of acid dyes, may be mentioned C.I. Acid Black 2, 52 and 208; C.I. Acid Yellow 11, 29 and 71; C.I. Acid Red 1, 52 and 317; C.I. Acid Blue 9, 93 and 254; C.I. Acid Orange 7 and 19; and C.I. Acid Violet 49. However, the present invention is not limited thereto.

(Basic Dye)

As examples of basic dyes, may be mentioned C.I. Basic Black 2; C.I. Basic Red 1, 12 and 27; C.I. Basic Blue 1 and 24; C.I. Basic Violet 7, 14 and 27; and C.I. Food Black 1 and 2. However, the present invention is not limited thereto.

(Reactive Dye)

As examples of reactive dyes, may be mentioned C.I. Reactive Black 1, 23 and 39; C.I. Reactive Yellow 2, 77 and 163; C.I. Reactive Red 3, 111 and 221; C.I. Reactive Blue 2, 101 and 217; C.I. Reactive Orange 5, 74 and 99; C.I. Reactive Violet 1, 24 and 38; C.I. Reactive Green 5, 15 and 23; and C.I. Reactive Brown 2, 18 and 33. However, the present invention is not limited thereto.

With respect to the size of the pigment as a coloring material, the average particle diameter is preferably 500 µm or smaller, more preferably 200 µm or smaller, still more preferably 100 µm or smaller.

The proportion of the coloring materials contained in the ink is preferably 0.1 to 20% by weight, more preferably 1 to 10% by weight based on the total weight of the ink. If the amount of the coloring material is lower than 0.1% by weight, the resulting ink cannot provide an image having a sufficient density. If the amount of the coloring material exceeds 20% by weight, the image density is not sufficiently increased, whereas lowering of ejection stability, such as clogging at an orifice, is incurred.

It is preferable to take a heterotic structure and/or a structure in which a part of the resin is adsorbed on the coloring material and/or a capsule structure between the coloring material and the resin having the polyvinyl ether structure containing the hydrophilic segment and hydrophobic segment. However, the present invention is not limited thereto.

A principal solvent of the water-based ink according to the present invention is water. Distilled water or ion-exchanged water may be used as the water. The proportion of water in the ink is preferably 40 to 95% by weight, more preferably 50 to 90% by weight based on the total weight of the ink.

The solvent of the water-based ink according to the present invention may contain any other water-soluble organic substance than water.

When the ink according to the present invention is used in an ink-jet printer, the organic substance acts on the prevention of solidification of the ink caused by drying at orifices. Specific examples thereof include alcohols such as isopropanol, butanol; diols such as ethylene glycol, diethylene glycol, triethylene glycol, tetraethylene glycol, propylene glycol, dipropylene glycol, tripropylene glycol, 1,2-butanediol, 1,3-butanediol, 1,4-butane diol, thiodiglycol, neopentyl glycol, 1,4-cyclohexanediol and polyethylene glycol; monoalkyl ethers of alkylene glycols, such as ethylene glycol monomethyl ether, ethylene glycol monoethyl ether, ethylene glycol monoisopropyl ether, ethylene glycol monoallyl ether, diethylene glycol monomethyl ether, diethylene glycol monoethyl ether, diethylene glycol monobutyl ether, triethylene glycol monomethyl ether, triethylene glycol monoethyl ether, propylene glycol monomethyl ether and dipropylene glycol monomethyl ether; polyols such as glycerol, 1,2,4-butanetriol, 1,2,5-pentanetriol, 1,2,6-hexanetriol, trimethylolethane, trimethylolpropane and pentaerythritol; cyclic ethers such as tetrahydrofuran and dioxane; and besides dimethyl sulfoxide, diacetone alcohol, glycerol monoallyl ether, N-methyl-2-pyrrolidone, 2-pyrrolidone, γ-butyrolactone, 1,3-dimethyl-2-imidazolidinone, sulfolane, urea, β-dihydroxyethylurea, acetonylacetone, dimethylformamide, dimethylacetamide and phenoxyethanol.

These organic substances may be either solid or liquid so far as they are soluble in water. The organic substances desirably have a boiling point higher than water, more desirably a boiling point of 120° C. or higher because they are required to remain in the ink even under such conditions as water is evaporated However, they are not limited to high-boiling substances because they become hard to be evaporated owing to the interaction with the block copolymer compared with the case where they are present singly.

These organic substances may be used either singly or in any combination thereof. The proportion of these organic substances in the ink is 5 to 50% by weight, preferably 10 to 30% by weight based on the total weight of the ink.

Various additives, for example, surfactants, pH adjustors, antioxidants, mildewproofing agents, etc. may be added to the ink according to the present invention in addition to the above-described components.

The ink according to the present invention may be suitably used in an ink-jet recording method, in which energy is applied to an ink to eject it, thereby conducting recording. As the energy, may be used thermal energy or mechanical energy. However, the method using the thermal energy is particularly preferred.

A printer for ink-jet recording may be applied to a household printer, in which A4-sized paper is mainly used, a printer for business cards and cards, a large-scale printer for business use, or the like.

Examples of recording media, on which recording is conducted with the ink according to the present invention, include plain paper, on which no special coating is applied, the so-called ink-jet paper with at least one side thereof coated with an ink-receiving layer, postal cards, paper for business card, paper for label, corrugated cardboards and films for ink-jet.

A second embodiment of the present invention is an ink-applying process comprising the step of applying the ink described above to a recording medium. More specifically, the embodiment is an image-forming method comprising applying an ink to a recording medium, thereby forming an image, wherein the ink used is the ink described above.

A third embodiment of the present invention is an ink-applying apparatus comprising an ink-applying means for applying the ink described above to a recording medium by applying energy to the ink, and a driving means for driving the ink-applying means. More specifically, the embodiment is an image-forming apparatus for forming an image by applying an ink to a recording medium, wherein the ink used is the ink described above.

These embodiments will hereinafter be described in detail.

(Image-forming Method and Image-forming Apparatus)

The ink according to the present invention can be used in various image-forming apparatus for various printing methods, ink-jet methods or electrophotographic methods. A drawing of an image can be made by an image-forming method using such an apparatus.

In the present invention, examples of an ink-jet printer using an ink-jet ink include various ink-jet recording apparatus such as a piezo ink-jet system using a piezoelectric element and a Bubble-Jet (trademark) system that thermal energy is applied to an ink to bubble the ink, thereby conducting recording.

For the image-forming apparatus according to the present invention, in the case of, for example, the ink-jet ink, the amount of the ink ejected from each ejection orifice of an ejection head is preferably within a range of from 0.1 pl to 100 pl for improving the resolution of the resulting image In the case of an ink-jet recording apparatus, as an embodiment thereof, the recording apparatus according to the present invention comprises a means for bringing the ink into contact with a composition giving a stimulus for changing a solvent environment. According to this embodiment, the ink is fixed to a recording medium by this contact to form an excellent image.

The ink according to the present invention may be used in an indirect recording apparatus using a recording system in which an image is formed on an intermediate transfer medium with an ink, and the image is then transferred to a recording medium such as paper. The ink may also be applied to an apparatus utilizing an intermediate transfer medium according to the direct recording system.

The ink according to the present invention may also be used in an image-forming method and image-forming apparatus of an electrophotographic system. As an example of this image-forming apparatus, may be mentioned an apparatus comprising a photosensitive drum, on which a latent image is formed, a means (exposer or the like) for forming the latent image thereon, an ink-applying means, a transfer mechanism and a recording medium. The formation of an image by this apparatus is as follows. A latent image is first formed on the photosensitive drum, the ink according to the present invention is applied to the latent image or another portion than the latent image, and the resultant image is transferred to a recording medium by the transfer mechanism and fixed thereto.

The ink-jet recording apparatus will hereinafter be schematically described by reference to FIGURE. However, the construction shown in FIGURE is taken merely as an example, and the present invention is not limited thereby.

FIGURE illustrates the construction of an ink-jet recording apparatus.

FIGURE shows the case where a head is moved to conduct recording on a recording medium. In FIGURE, an X-direction drive motor 56 and a Y-direction drive motor 58 for driving a head 70 in X and Y directions, respectively, are connected to CPU 50, which controls the overall operation of the recording apparatus, through an X-motor drive circuit 52 and a Y-motor drive circuit 54. The X-direction drive motor 56 and the Y-direction drive motor 58 are driven through the X-motor drive circuit 52 and the Y-motor drive circuit 54 according to an indication of CPU to determine the position of the head 70 to a recording medium.

As illustrated in FIGURE, a head drive circuit 60 is connected to the head 70 in addition to the X-direction drive motor 56 and the Y-direction drive motor 58, and CPU 50 controls the head drive circuit 60 to drive the head 70, i.e., conduct ejection of an ink-jet ink, and the like. Further, an X-encoder 62 and a Y-encoder 64 for detecting the position of the head 70 are connected to CPU 50 to input the positional information of the head 70. A control program is also inputted in a program memory 66. CPU 50 moves the head 70 on the basis of this control program and the positional information from the X-encoder 62 and the Y-encoder 64 to arrange the head 70 at a desired position over the recording medium so as to eject the ink-jet ink. A desired image can be drawn on the recording medium in such a manner. In the case of an image-recording apparatus capable of charging plural kinds of ink-jet inks, such a process as described above is conducted prescribed times for the respective ink-jet inks, whereby a desired image can be drawn on a recording medium.

After the ink-jet ink is ejected, the head 70 may also be moved to a position where a removing means (not illustrated) for removing an excessive ink attached to the head 70 is arranged, as needed, to clean the head 70 by wiping or the like. As a specific method of the cleaning, any conventional method may be used as it is.

After the drawing of the image is completed, the recording medium, on which the image has been drawn, is replaced with a new recording medium by a recording-medium-conveying mechanism (not illustrated).

In the present invention, the above-described embodiment may be changed or modified within limits not departing from the point thereof. For example, the head 70 may be moved only to the X direction (or Y direction), and the recording medium may be moved to the Y direction (or X direction) to draw an image while interlocking these movements, though the example where the head 70 is moved to both X and Y directions has been described in the above-described embodiment.

In the present invention, a head equipped with a means (for example, electrothermal converter or laser beam) for generating thermal energy as an energy source used for ejecting an ink-jet ink and ejecting the ink-jet ink by the thermal energy brings about an excellent effect. According to such a system, high definition of the drawing can be achieved. Far excellent drawing can be made by using the ink-jet ink according to the present invention.

With respect to the typical construction and principle of the apparatus equipped with the means for generating the thermal energy, those using the basic principle disclosed in, for example, U.S. Pat. Nos. 4,723,129 and 4,740,796 are preferred. This system may be applied to any of the so-called On-Demand type and continuous type. In particular, the On-Demand type is effective because at least one driving signal which corresponds to ejection information and gives a rapid temperature rise exceeding nuclear boiling is applied to an electrothermal converter arranged corresponding to a liquid path, in which a liquid is retained, thereby causing the electrothermal converter to generate thermal energy to cause film boiling on the heat-acting surface of a head, so that a bubble can be formed in the liquid in response to the driving signal in relation of one to one. The liquid is ejected through an ejection opening by the growth-contraction of this bubble to form at least one droplet. When the driving signal is applied in the form of a pulse, the growth-contraction of the bubble is rapidly and suitably conducted, so that responsive ejection of the liquid can be achieved in particular. It is therefore more preferable to use such pulsed signals. As the pulsed driving signal, such signals as described in U.S. Pat. Nos. 4,463,359 and 4,345,262 are suitable. When the conditions described in U.S. Pat. No. 4,313,124 that discloses an invention relating to the rate of temperature rise on the heat-acting surface are adopted, far excellent ejection can be conducted.

As the construction of the head, such combined constructions (linear liquid flow path or perpendicular liquid flow path) of ejection openings, a liquid flow path and electrothermal converters as disclosed in the above-described publications, and besides constructions based on U.S. Pat. Nos. 4,558,333 and 4,459,600 which disclose the construction that a heat-acting portion is arranged in a curved region may also be included in the present invention. In addition, the effect of the present invention is useful even for constructions based on Japanese Patent Application Laid-Open No. 59-123670 which discloses the construction that a slit common to a plurality of electrothermal converters is used as an ejection part of the electrothermal converters, and Japanese Patent Application Laid-Open No. 59-138461 which discloses the construction that an opening which absorbs pressure wave of thermal energy is provided in opposition to an ejection part. Namely, the ejection of the ink-jet ink can be surely and efficiently conducted according to the present invention even if the head is in any form.

Further, the present invention may also be applied to a full-line type head having a length corresponding to the longest width of recording media. Both construction that the length is satisfied by a combination of plural recording heads and construction as one head integrally formed may be used as such a head.

In addition, the present invention is effective even when among those of the serial type, a head fixed to an apparatus body, or a replaceable chip type head in which electrical connection to the apparatus body and feed of an ink from the apparatus body become feasible by being installed in the apparatus body is used.

Further, the apparatus according to the present invention may additionally have a droplet-removing means. When such a means is equipped, a far excellent ejecting effect can be realized.

Moreover, the addition of preliminary auxiliary means, etc. as constitution of the apparatus according to the present invention is preferred because the effects of the present invention can be more stabilized. As specific examples thereof, may be mentioned capping means for the head, pressurizing or sucking means, preliminary heating means for conducting heating by electrothermal converters, other heating elements than these or combinations thereof, and preliminary ejecting means for conducting ejection different from ejection of an ink.

In the present invention, it is most effective to perform the above-described film boiling system.

The present invention will hereinafter be described more specifically by the following examples and comparative examples. However, the present invention is not limited by these examples so far as it is not beyond the gift of the present invention. Incidentally, all designations of "part" or "parts" and "%" as will be used in the following examples mean part or parts by mass and % by mass unless expressly noted.

In the following examples, particle diameters, the molecular weights and molecular weight distributions of resins were measured by means of a dynamic light-scattering method (using Laser Particle Diameter Analysis System PAR-III, trade name; manufactured by Otsuka Electronics Co., Ltd.) and GPC (Gel Permeation Chromatography; using HLC-8220 GPC, trade name, manufactured by Tosoh Corp.), respectively, and the identification of the resins was conducted by means of NMR (nuclear magnetic resonance spectrometry) (DPX400, trade name, manufactured by Bruker Biospin Co.)

EXAMPLE 1

Synthesis of ABC Triblock Copolymer:

(Polymer 1)

After the interior of a glass container equipped with a three-way stop-cock was purged with nitrogen, the container was heated to 250° C. under a nitrogen gas atmosphere to remove adsorbed water. After the system was returned to room temperature, 12 mmol of 1-isobutyl vinyl ether, 16 mmol of ethyl acetate, 0.1 mmol of 1-isobutoxyethyl acetate and 11 ml of toluene were added. At the time the temperature within the system was cooled to 0° C., 0.2 mmol of ethylaluminum sesquichloride was added to initiate polymerization, thereby synthesizing a component A of a triblock copolymer. The molecular weight was periodically monitored by means of gel permeation chromatography (GPC; HLC-8220 manufactured by Tosoh Corp.). After completion of the polymerization of the component A, 12 mmol of 2-methoxyethyl vinyl ether that is a component B was added to continue the polymerization. Completion of the polymerization of a component B was confirmed by monitoring by means of GPC in the same manner as described above.

Then, 12 mmol of ethyl 4-(2-vinyloxyethoxy)benzoate that is a component C was added to continue the polymerization. The termination of the polymerization reaction was conducted by adding a 0.3% by weight solution of ammonia/methanol into the system. In such a manner, a triblock copolymer (Polymer 1) was obtained. The identification of the triblock copolymer thus obtained was conducted by means of a nuclear magnetic resonance absorption measurement apparatus and GPC. Both analyses revealed that the intended substance had been synthesized.

(Polymers 2 to 6)

Triblock copolymers (Polymers 2 to 6), which were different from one another in molecular weights of components B and C that are hydrophilic segments and a component A that is a hydrophobic segment as shown in Table 1, were obtained in the same manner as in Polymer 1 except that the amounts of the respective components A, B and C added were variously changed.

Incidentally, Polymer 2 was synthesized in the form of a diblock polymer containing no segment B.

The ratio (Mw/Mn) of weight average molecular weight (Mw)/number average molecular weight (Mn) that indicates the degree of a molecular weight distribution was within a range of from 1.2 to 1.3 in all of Polymers 1 to 6. The ester portion of the component C of each of these triblock polymers was hydrolyzed with a mixture of an aqueous solution of 5 times equivalent sodium hydroxide and methanol, and the solvent was distilled off to obtain polymers in the form of a carboxylic acid.

The number average molecular weights of Polymers 1 to 6, the number average molecular weights of the hydrophobic segments and hydrophilic segments, and the HLB values of the polymer are shown in Table 1.

TABLE 1

|  | Mn of copolymer | Mn of hydrophobic segment | Mn of hydrophilic segment | HLB |
|---|---|---|---|---|
| Polymer 1* | 10,500 | 10,000 | 500 | 0.95 |
| Polymer 2 | 13,000 | 10,000 | 3,000 | 4.6 |
| Polymer 3 | 43,000 | 10,000 | 33,000 | 15.3 |
| Polymer 4 | 50,000 | 10,000 | 40,000 | 16 |
| Polymer 5 | 50,000 | 15,000 | 35,000 | 14 |
| Polymer 6* | 45,000 | 4,000 | 41,000 | 18.2 |

(Note)
Polymers 2 to 5 were of examples, and Polymers 1 and 6 were of comparative examples.

Preparation of Water-based Inks 1 to 6:

The above-described Polymers 1 to 6 neutralized with an alkali were respectively used to prepare Water-based Inks 1 to 6 in the following manner. One part by weight of the polymer and 1 part by weight of C.I. Solvent Blue 44 were dissolved in 9 parts by weight of N,N-dimethylformamide. After 18 parts by weight of water was added to the resultant solution, N,N-dimethylformamide was removed by a rotary evaporator, and 2 parts by weight of diethylene glycol and 2 parts by weight of glycerol were added to the residue to obtain a water-based ink.

Preparation of Water-based Ink 7:

Water-based Ink 7 was prepared in the same manner as in the preparation of Water-based Inks 1 to 6 except that a n-butyl methacrylate-methacrylic acid block copolymer (number average molecular weight: 10,000; number average molecular weight of a hydrophilic segment: 5,000) was used in place of Polymers 1 to 6.

Water-based Inks 1 to 7 were used to evaluate them as to viscosity, fixing ability and blur of a printed image in accordance with the following respective evaluation methods. The results thereof are shown in Table 2.

Evaluation Methods:

(Viscosity)

The viscosity of each ink was measured by means of an E-type rotational viscometer at 20° C. The viscosity is preferably 3.5 mPa.s or lower, more preferably 3.0 mPa.s or lower for stable ejection.

(Fixing Ability)

Each of the inks was charged into an ink-jet recording apparatus, BJF-660 (trade name, manufactured by Canon Inc.) which ejects an ink by application of thermal energy, and printing was conducted on gloss paper, SP101 (trade name, product of Canon Inc.). Kimwipes were placed on the paper printed, and additionally, a weight of 500 g/12.56 cm² was placed thereon to evaluate the ink as to rub-off resistance with 5 ranks when the Kimwipes had been reciprocatingly moved 5 times.

5: No rub-off was observed;
4: Rub-off was slightly observed, but still practicable without problems;
3: Rub-off was clearly observed, but the print was readable;
2: Partially difficult to read the print;
1: Impossible to read the print.

(Blur of Printed Image)

The degree of blur of a printed image was organoleptically evaluated. A white stripe portion where no printing was made was regarded as "blur".

5: No problem caused;
4: Slight blur was observed, but still practicable without problems;
3: Blur was clearly observed, but the print was readable;
2: Difficult to read the print due to many blurred portions;
1: The ink was scarcely ejected.

TABLE 2

|  | Viscosity (mPa · s) | Fixing ability | Blur of printed image |
|---|---|---|---|
| Water-based Ink 1* | 2.0 | 3 | 5 |
| Water-based Ink 2 | 2.4 | 5 | 5 |
| Water-based Ink 3 | 2.5 | 5 | 5 |
| Water-based Ink 4 | 3.4 | 5 | 5 |
| Water-based Ink 5 | 2.7 | 5 | 5 |
| Water-based Ink 6* | 6.8 | 5 | 3 |
| Water-based Ink 7* | 2.1 | 2 | 1 |

(Note)
Water-based Inks 2 to 5 were of examples, and Water-based Inks 1, 6 and 7 were of comparative examples.

EXAMPLE 2

Polymers shown in Table 3 were synthesized in the same manner as in EXAMPLE 1.

TABLE 3

|  | Mn of polymer | Mn of hydrophobic block | Mn of hydrophilic block |
|---|---|---|---|
| Polymer 7 | 18,000 | 8,000 | 10,000 |
| Polymer 8 | 24,000 | 8,000 | 16,000 |
| Polymer 9 | 49,000 | 8,000 | 41,000 |

The HLB values of Polymers 7, 8 and 9 were 11.1, 13.3 and 16.8, respectively. These polymers were respectively used to prepare Water-based Inks 8, 9 and 10 in the same manner as in EXAMPLE 1. The degree of blur of a printed image was evaluated. As a result, all the inks were evaluated as rank 5.

With respect to Water-based Inks 1, 2, 3, 8, 9 and 10, a test for water fastness and rub-off resistance was conducted by strongly rubbing the respective printed areas 5 times with a line marker. The results organoleptically evaluated with 5 ranks were ranks 1, 2, 4, 3, 3 and 5, respectively.

As described above, the inks according to the present invention are good in both ejection stability from a nozzle and fixing ability of an image formed, so that they can be used as inks for ink-jet recording. The ink-applying process and ink-applying apparatus according to the present invention can provide prints good in faxing ability of image formed using the inks described above and can be used as ink-jet recording methods and recording apparatus good in ejection stability of an ink from a nozzle.

This application claims priority from Japanese Patent Application No. 2003-381042 filed Nov. 11, 2003, which is hereby incorporated by reference herein.

What is claimed is:

1. An ink comprising a coloring material, a resin, and a solvent, wherein the resin is a block copolymer comprising a polyvinyl ether structure, the block copolymer having a hydrophilic segment and a hydrophobic segment and having an HLB value of 4 to 18, and the hydrophilic segment of the block copolymer has a number average molecular weight of 1,000 to 50,000, wherein the hydrophobic block segment of the block copolvmer has a number average molecular weight of 5,000 or higher, and wherein an anionic hydrophilic repeating unit structure is contained in the hydrophilic segment of the block copolymer.

2. The ink according to claim 1, wherein the HLB value falls within a range of from 14 to 18.

3. The ink according to claim 1, wherein the proportion of the block copolymer falls within a range of from 0.001 to 40% by weight based on the total weight of the ink.

4. The ink according to claim 1, wherein the proportion of the coloring material falls within a range of from 0.1 to 20% by weight based on the total weight of the ink.

5. The ink according to claim 4, wherein the coloring material is composed of a pigment.

6. The ink according to claim 5, wherein the pigment has a size of 500 μm or smaller.

7. An ink-applying process comprising the step of applying the ink according to claim 1 to a recording medium.

8. An ink-applying apparatus comprising an ink-applying means for applying the ink according to claim 1 to a recording medium by applying energy to the ink, and a driving means for driving the ink-applying means.

* * * * *

UNITED STATES PATENT AND TRADEMARK OFFICE
CERTIFICATE OF CORRECTION

PATENT NO. : 7,328,991 B2  
APPLICATION NO. : 10/983572  
DATED : February 12, 2008  
INVENTOR(S) : Koichi Sato et al.

It is certified that error appears in the above-identified patent and that said Letters Patent is hereby corrected as shown below:

COLUMN 5:
Line 36, "may" should read --may be--.

COLUMN 8:
Line 2, "Brawn" should read --Brown--.

COLUMN 10:
Line 19, "image" should read --image.--.

COLUMN 16:
Line 22, claim 1, "copolvmer" should read --copolymer--.

Signed and Sealed this

Twenty-ninth Day of July, 2008

JON W. DUDAS  
*Director of the United States Patent and Trademark Office*

UNITED STATES PATENT AND TRADEMARK OFFICE
CERTIFICATE OF CORRECTION

PATENT NO. : 7,328,991 B2  Page 1 of 1
APPLICATION NO. : 10/983572
DATED : February 12, 2008
INVENTOR(S) : Koichi Sato et al.

It is certified that error appears in the above-identified patent and that said Letters Patent is hereby corrected as shown below:

COLUMN 5:
Line 36, "may" should read --may be--.

COLUMN 8:
Line 2, "Brawn" should read --Brown--.

COLUMN 10:
Line 19, "image" should read --image.--.

COLUMN 16:
Line 22, "copolvmer" should read --copolymer--.

Signed and Sealed this

Nineteenth Day of August, 2008

JON W. DUDAS
*Director of the United States Patent and Trademark Office*